United States Patent [19]

Mita

[11] Patent Number: 5,010,239
[45] Date of Patent: Apr. 23, 1991

[54] IC CARD READER/WRITER

[75] Inventor: Katsuya Mita, Kyoto, Japan

[73] Assignee: Omron Tateisi Electronics Co., Kyoto, Japan

[21] Appl. No.: 253,036

[22] Filed: Oct. 4, 1988

[30] Foreign Application Priority Data

Oct. 9, 1987 [JP] Japan .................. 62-155056[U]

[51] Int. Cl.⁵ .............................................. G06F 7/06
[52] U.S. Cl. .................................. 235/441; 235/440; 235/492
[58] Field of Search ............... 235/441, 440, 449, 488, 235/493, 492; 360/2

[56] References Cited

FOREIGN PATENT DOCUMENTS 2477303 9/1981 France .

OTHER PUBLICATIONS

European Search Report, The Hague, 12-21-88.

Primary Examiner—Harold I. Pitts
Attorney, Agent, or Firm—Dickstein, Shapiro & Morin

[57] ABSTRACT

A shutter is provided near an IC card inserting port of an IC card reader/writer. Contact members adapted to be come into contact with the contacts of an IC card are provided for a member constructing the shutter. When the shutter is closed, the contact members are located at positions such that they can come into contact with the contacts of the IC card.

3 Claims, 9 Drawing Sheets

IC CARD READER/WRITER

BACKGROUND OF THE INVENTION

The present invention relates to an IC card reader/writer for inputting (writing) or fetching (reading out) data into or from what is called an IC card including therein at least either one of a memory, a CPU, and various kinds of electronic circuits which are constructed as an IC (Integrated Circuit). In this specification, the IC card reader/writer includes devices for writing data, devices for only for reading out data, and devices for both writing and reading data.

A great number of IC cards are nowadays used as bank cards, credit cards and the like. A plurality of (e.g., eight) contacts for data transmission and reception are provided on the surface of the IC card. On the other hand, a connector having a plurality of contact members adapted to be come into contact with the contacts of the IC card is movably provided in the IC card reader/writer. When an IC card is conveyed into the IC card reader/writer by a conveying apparatus and stopped to a predetermined position, the contact members of the connector approach and come into contact with the contacts of the IC card, so that data can be transmitted and received between the IC card reader/writer and the electronic circuits in the IC card.

On the other hand, in the IC card reader, a shutter needs to be provided near a card inserting port so as to prevent the IC card from being moved or pulled out during the reading/writing operation of the IC card.

However, in the conventional IC card reader, since the drive section of the connector and the drive section of the shutter are individually provided, there are various problems such that the structure is complicated, the number of parts increases, and the cost and size also increase.

Further, as is well known, as a format of the contacts, a plurality of formats such as U.S.A. format, JPN format, BULL format and the like (which will be practically explained hereinafter) are proposed. The conventional IC card reader has a problem such that the reading/writing operation can be performed for only a single format.

Particularly, in the IC card having a magnetic stripe and also having as a function as a magnetic card, the relations between the position of the contacts and the position of the magnetic stripe all differ in the above-mentioned several formats. Therefore, there is a problem such that a special arrangement of the magnetic head to magnetically write or read out data into/from the magnetic stripe and the connector adapted to be come into contact with the contacts of the IC card must be designed in accordance with each format.

SUMMARY OF THE INVENTION

It is an object of the present invention to provide an IC card reader/writer having a simple structure.

According to the present invention, this object is accomplished by an IC card reader/writer having an IC card conveying apparatus which extends from an IC card inserting port of the IC card reader/writer to an inside of the IC card reader/writer, comprising: shutter means, provided near the IC card inserting port, for opening or closing the card inserting port; and drive means to open or close the shutter means, wherein the shutter means comprises a shutter portion to open or close the card inserting port and a supporting portion, the supporting portion being provided with a connector having contact members adapted to come into contact with contacts of an IC card, and when the shutter portion is located at a position where the card inserting port is closed, the connector is located at positions such that the contact members can be come into contact with the contacts of the IC card.

According to the invention, since the opening or closing of the shutter and the moving operation of the connector can be accomplished by one drive means, the structure is simplified and the number of parts also decreases, thereby contributing to the reduction of the cost and size. On the other hand, when the contact members of the connector are in contact with the contacts of the IC card, the shutter is closed. Thus, it is possible to prevent such an accident that the IC card is moved or pulled out during the reading/writing operation of the IC card.

DETAILED DESCRIPTION OF THE PREFERRED EMBODIMENT

Figure 1C:
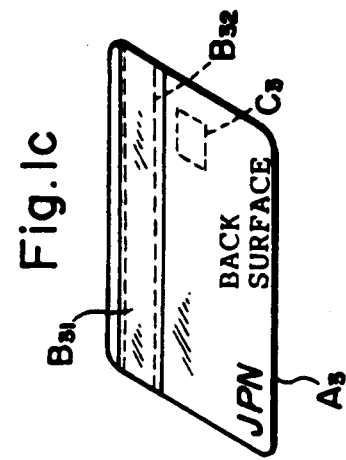
FIGS. 1a to 1d show IC cards of various formats.
Figure 1B:
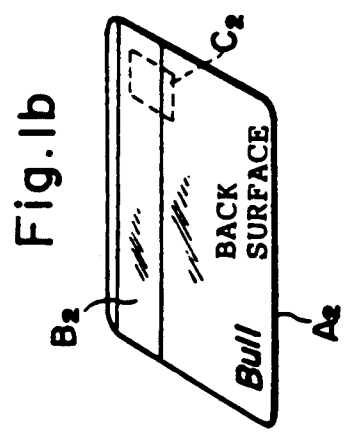
Figure 1D:
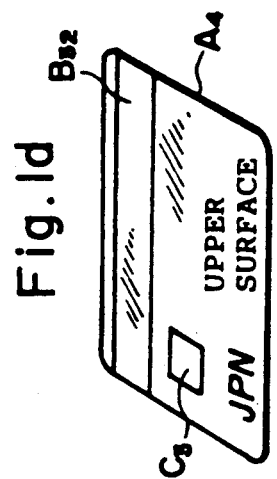
Figure 1A:
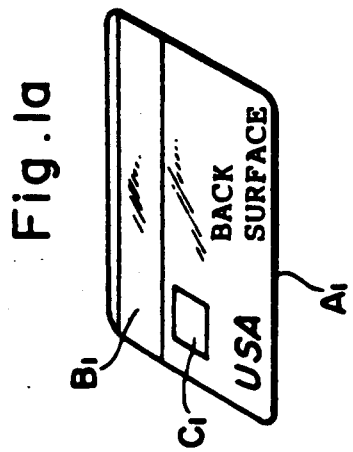

FIGS. 1a to 1d are views of a plurality of MS (Magnetic Stripe)/IC cards disclosed in the ISO (International Organization for Standardization) standards. FIG. 1a shows a back surface of a card $A_1$ of the proposed U.S.A. format (the third format in ISO), in which a magnetic stripe $B_1$ and an IC contact portion $C_1$ are provided on the back surface of the card $A_1$ as shown in the diagram. FIG. 1b shows a back surface of a card $A_2$ of the proposed BULL format (the first format in ISO) of France, in which an IC contact portion $C_2$ is provided on the opposite side (upper surface side) in correspondence to a magnetic stripe $B_2$ provided on the back surface. FIG. 1c shows a back surface of a card $A_3$ of the proposed JPN format (the second format in ISO), in which a magnetic stripe $B_{32}$ of the JIS (Japanese Industrial Standard) II type and an IC contact portion $C_3$ are provided on the opposite side (upper surface side) in correspondence to a magnetic stripe $B_{31}$ of the JIS I type provided on the back surface so as to have the positional relation as shown in the diagram. FIG. 1d shows a surface of an IC card $A_4$ with a magnetic stripe of the JIS II type, in which the magnetic stripe $B_{32}$ of the JIS II type and the IC contact portion $C_3$ are provided on the upper surface of the card so as to have the positional relation as shown in the diagram. A discrimination regarding the upper or back surface of the card is performed on the basis of, for instance, an emboss. The emboss is formed like a projection on the upper surface and like a recess portion on the back surface. It is not always necessary to provide a magnetic stripe on the IC card. Each of the contact portions $C_1$, $C_2$ and $C_3$ has a plurality of (e.g., eight) contacts.

Figure 2:
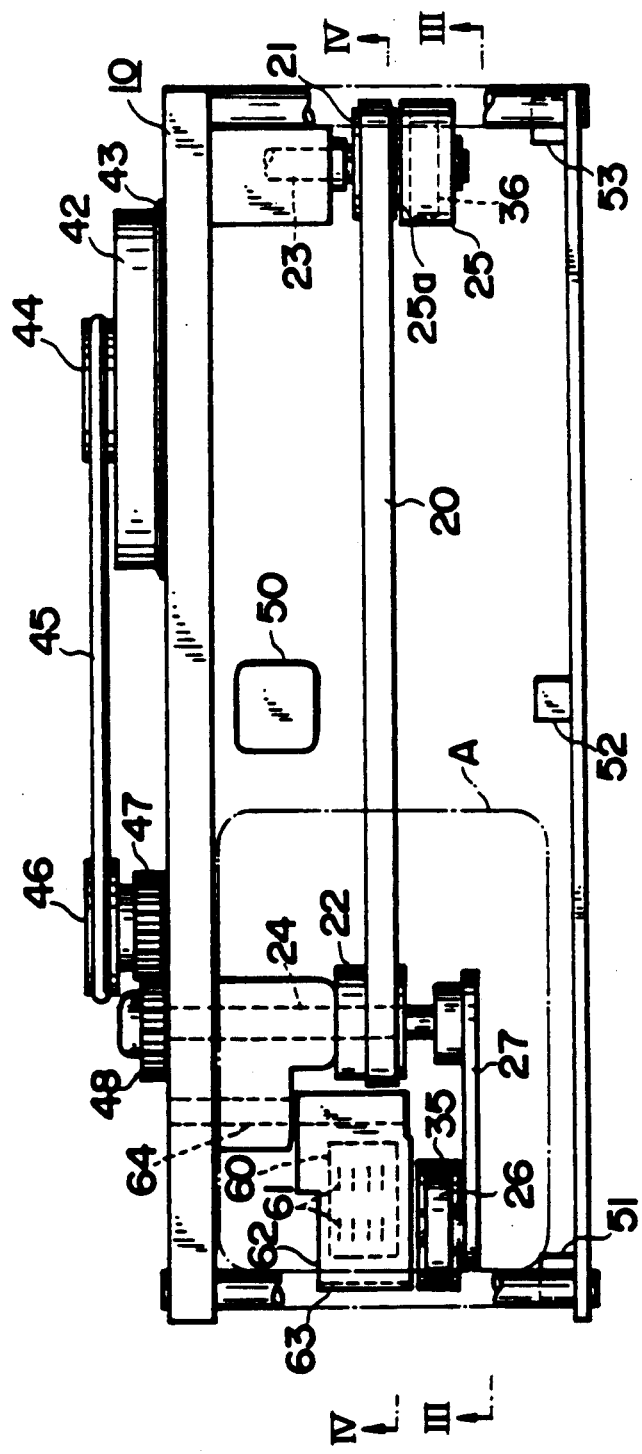
FIG. 2 is a plan view of an embodiment of the present invention.
Figure 3:
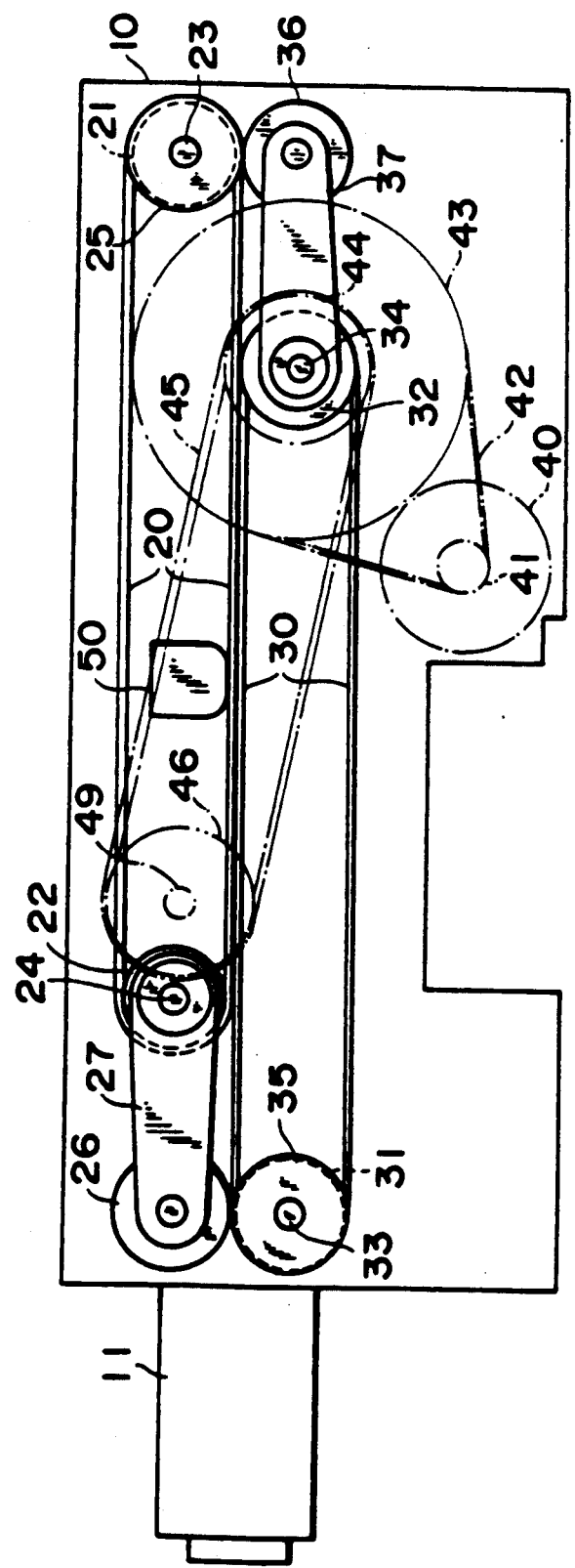
FIG. 3 is a cross sectional view taken along the line III—III in FIG. 2.
Figure 4:
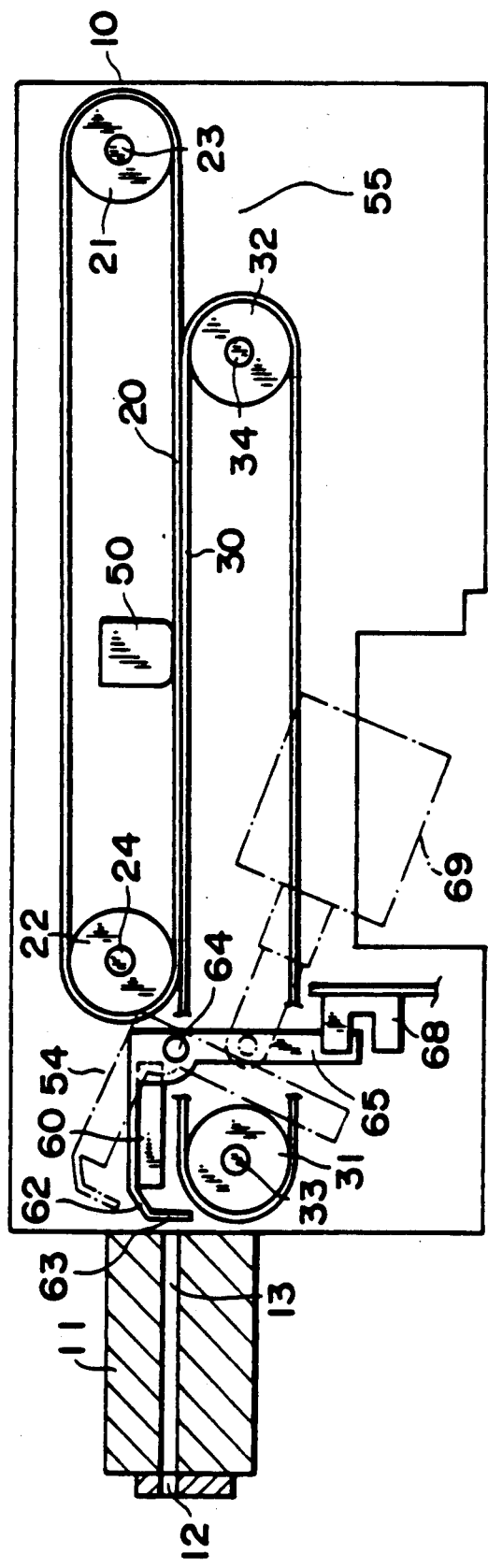
FIG. 4 is a cross sectional view taken along the line IV—IV in FIG. 2.

FIGS. 2 to 4 show a mechanical arrangement of the IC card reader/writer.

An inserting port assembly 11 is provided in a part (at the left end in the diagram) of a frame 10 of the IC card reader/writer. An IC card inserting port 12 is opened in the front edge portion of the assembly 11. A short card-guide path 13 is provided in the assembly 11 from the inserting port 12 toward the frame 10. A sensor to detect whether the inserted card is a predetermined card or not on the basis of the width of the inserted card, a sensor to check whether data has been recorded on a magnetic stripe of the card or not, and the like are provided on the guide path 13. If the inserted card is determined to be a normal card by those sensors, a shutter, which will be explained hereinafter, is opened.

An apparatus for conveying the inserted card is provided in the frame 10. The card conveying apparatus includes an upper conveying belt 20 and a lower conveying belt 30. The belts 20 and 30 are provided at the almost central position in the width direction of the frame 10. The upper conveying belt 20 is reeved around pulleys 21 and 22. The lower conveying belt 30 is reeved around pulleys 31 and 32. The pulley 21 is rotatably attached to a shaft 23 fixed to the frame 10. The pulley 22 is fixed to a rotating shaft 24 which is rotatably supported to the frame 10. Likewise, the pulley 31 is rotatably attached to a shaft 33 fixed to the frame 10. The pulley 32 is fixed to a rotating shaft 34 which is rotatably supported to the frame 10.

A small pulley 41 is fixed to an output shaft of a drive motor 40 fixed to the frame 10. On the other hand, a large pulley 43 and a middle pulley 44 are fixed to the rotating shaft 34 on the outside of the frame 10. A belt 42 is reeved around the pulleys 41 and 43. Therefore, the lower conveying belt 30 is driven by the drive motor 40 through the pulley 41, belt 42, pulley 43, rotating shaft 34 and pulley 32.

On the other hand, a rotating shaft 49 is rotatably supported to the outside of the frame 10. A pulley 46 and a gear 47 are fixed to the rotating shaft 49. A belt 45 is reeved between the pulleys 46 and 44. On the outside of the frame 10, a gear 48 is fixed to the rotating shaft 24. The gear 48 is come into engagement with the gear 47. Therefore, the upper conveying belt 20 is driven by the drive motor 40 synchronously with the lower conveying belt 30 through the rotating shaft 34, pulley 44, belt 45, pulley 46, rotating shaft 49, gear 47, gear 48, rotating shaft 24, and pulley 22. The IC card is sandwiched between the upper and lower conveying belts 20 and 30 and conveyed. By switching the forward/reverse rotation of the drive motor 40, the IC card can be conveyed from one end, i.e., the side of the inserting port 12 of the frame 10 toward the other end of the frame 10 (in the carrying-in direction) and in the opposite direction (ejecting direction).

It should be particularly noted that the upper and lower conveying belts 20 and 30 are arranged so as to be deviated from each other in the conveying direction of the IC card. Thus, in one end portion on the side of the IC card inserting port 12, a space 54 is formed over the lower conveying belt 30 in the central portion in the width direction of the frame 10. In the other end portion in the frame 10, a space 55 is formed below the upper conveying belt 20 in the central portion in the width direction of the frame 10. A connector having a plurality of contact members adapted to respectively come into contact with the contacts of the contact portion of the IC card can be arranged in the spaces 54 and 55, as will be explained hereinlater.

Means for holding the IC card are provided on the side of the spaces 54 and 55. The holding means comprises a receiving roller and pressing roller.

That is, a receiving roller 35 and a pressing roller 26 are provided on the side of the space portion 54. The receiving roller 35 is rotatably supported to the shaft 33 and rotates together with the pulley 31 by being coupled with the pulley 31 by a pin (not shown). The pressing roller 26 is rotatably attached to a free end portion of a lever 27 which is rotatably supported to the rotating shaft 24. The lever 27 is pressed by a spring (not shown), so that the pressing roller 26 comes into pressure contact with the receiving roller 35.

In a manner similar to the above, a receiving roller and a pressing roller 36 are provided on the side of the space portion 55. The receiving roller 25 is rotatably attached to the shaft 23 and is rotated together with the pulley 21 by being coupled with the pulley 21 by a pin 25a. The pressing roller 36 is rotatably attached to a free end portion of a lever 37 which is rotatably attached to the rotating shaft 34. Since the lever 37 is pressed by a spring (not shown), the pressing roller 36 comes into pressure contact with the receiving roller 25.

In the embodiment shown in FIGS. 2 to 4, a connector 60 is provided in only the space portion 54 near the card inserting port 12. As mentioned above, the connector 60 holds a plurality of contact members 61 so as to be mutually isolated. The connector 60 is attached and fixed to a swing supporting plate 62 and the contact members 61 are directed to the lower conveying belt 30. The swing supporting plate 62 has a lever portion 65 extending downwardly from one end portion thereof. At a proper portion of the lever portion 65, the swing supporting plate 62 is swingably supported by a fulcrum shaft 64 fixed to the frame 10. A leading portion 63 serving as a shutter is integrally formed in the front edge portion of the swing supporting plate 62. The swing supporting plate 62 is driven by a solenoid 69 attached to the frame 10. When the IC card is held and positioned at a predetermined location between the upper conveying belt 20 and pressing roller 26, and the lower conveying belt 30 and receiving roller 35, the swing supporting plate 62 is held to an attitude indicated by a solid line in FIG. 4. At this time, the contact members 61 of the connector 60 come into contact with the contacts of the positioned IC card and at the same time, the leading portion 63 shuts off the passage between the card inserting port 12 and the conveying path between both of the upper and lower conveying belts 20 and 30 (the shutter is closed). Further, a part of the lever 65 is detected by a sensor 68. On the basis of a detection signal of the sensor 68, it is confirmed that the connector 60 is in contact with the IC card.

When the supporting plate 62 obliquely rises by the actuation of the solenoid 69 as shown by an alternate long and short dash line in FIG. 4, the connector 60 is away from the IC card. The leading portion 63 is also removed from the conveying path and the shutter is opened.

In the frame 10, a magnetic head 50 is arranged on one side on the way of the conveying path of the IC card and fixed to the frame 10. The magnetic head 50 reads out data recorded on the magnetic stripe of the IC card or writes data onto the magnetic stripe. Although not shown, a pressing roller is disposed at a position which faces the magnetic head 50. This pressing roller is pressed in the direction of the magnetic head 50. By sandwiching the IC card by the magnetic head 50 and the pressing roller, data can be stably and certainly read out or written by the magnetic head 50.

Further, first, second and third sensors 51, 52 and 53 to detect the IC card which is conveyed by the conveying apparatus are attached to one end, a central position and the other end in the card conveying direction of the frame 10, respectively.

Figure 5:
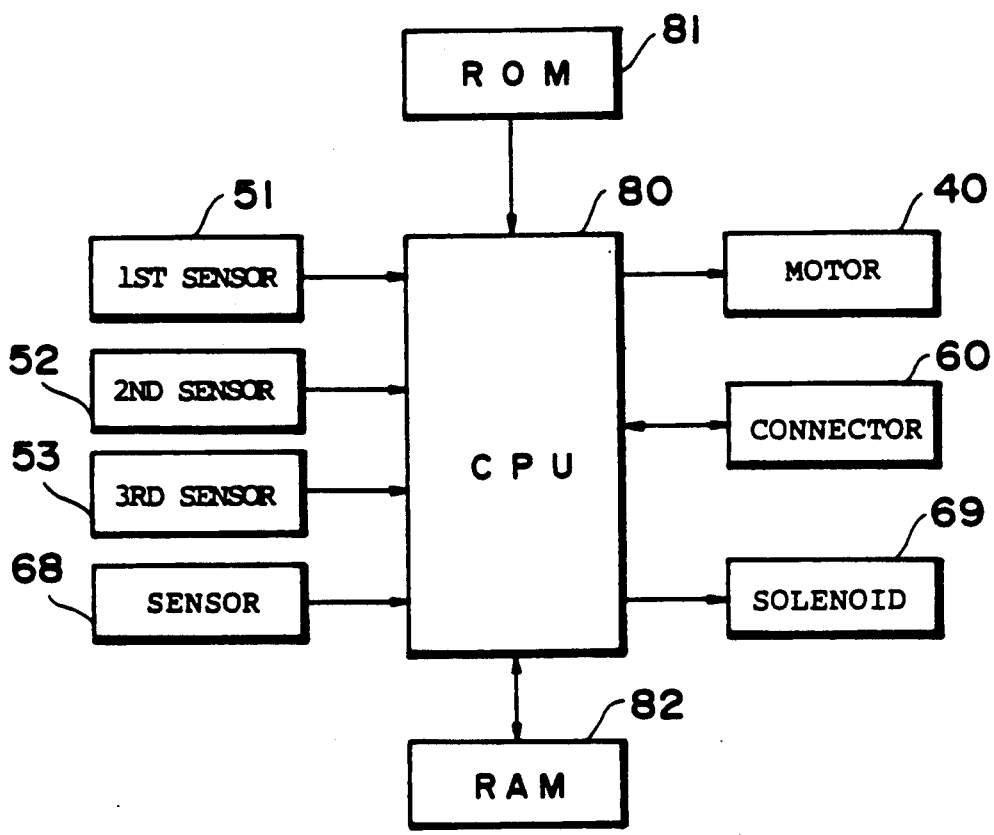
FIG. 5 is a block diagram showing an electrical arrangement of an IC card reader/writer.

FIG. 5 shows an outline of an electrical arrangement of the IC card reader/writer. The IC card reader/writer includes a CPU 80. The CPU 80 has an ROM 81 in which a program is stored and an RAM 82 to store various data. The first to third sensors 51 to 53, sensor 68, connector 60, motor 40 and solenoid 69 are connected to the CPU 80 through proper interfaces, respectively. As will be explained hereinafter, the CPU 80 controls the motor 40 and solenoid 69 on the basis of detection signals from the sensors 51 to 53 and the other sensors. On the other hand, the CPU 80 performs the reading/writing processes to write the data of the RAM 82 into the IC card and to store the data read out of the IC card into the RAM 82 through the connector 60.

The structure shown in FIGS. 2 to 4 can be applied to the IC cards $A_1$, $A_3$, and $A_4$ (hereinafter, the IC card is simply indicated at reference character A) of the U.S.A. format and JPN format. In the case of using the IC card of the U.S.A. format, the back surface of the card faces upward and the card is inserted from the inserting port 12. In the case of using the IC card of the JPN format, the upper surface faces upward and the card is inserted from the inserting port 12.

Figure 6:
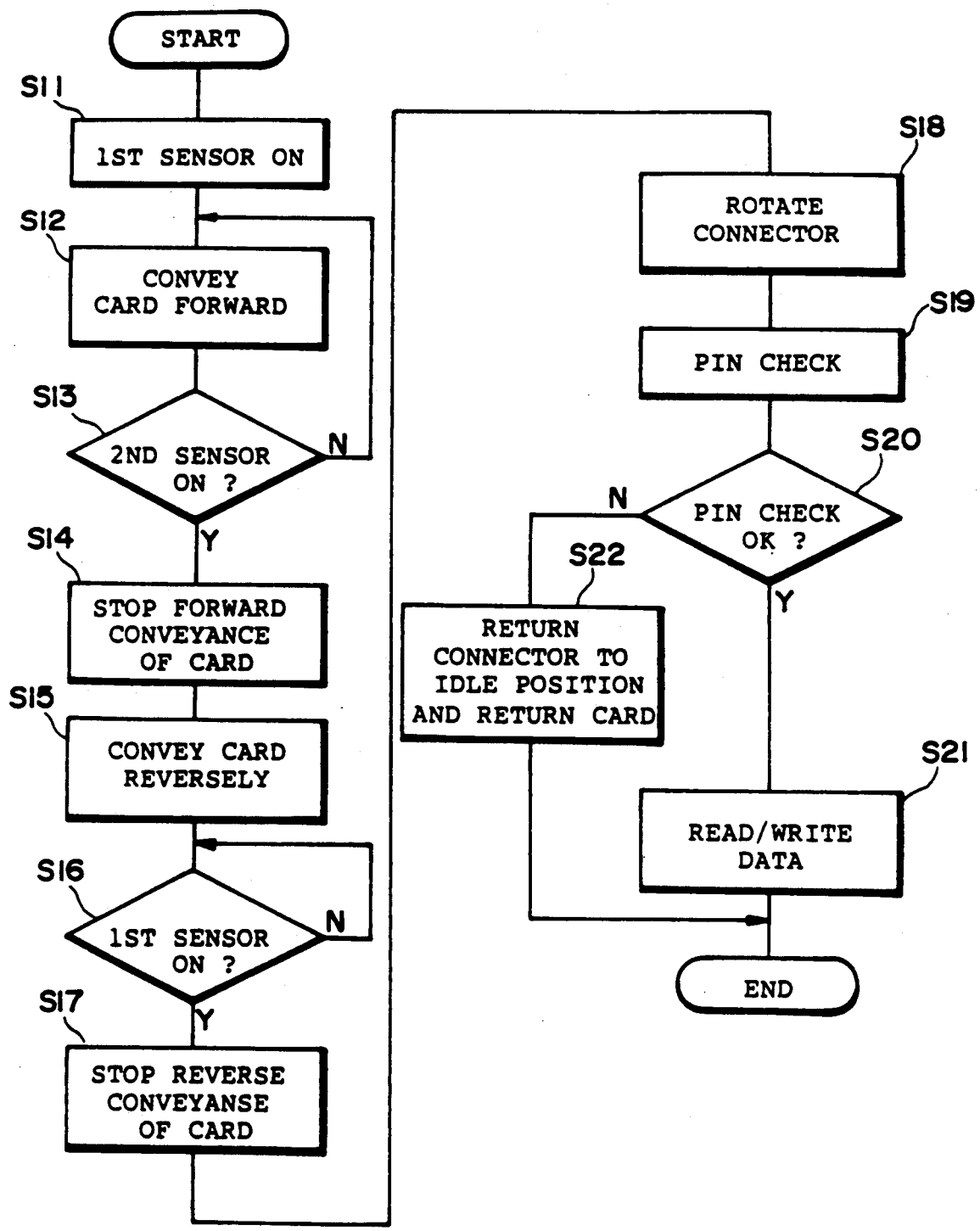
FIG. 6 is a flowchart showing the operation of the IC card reader/writer.

The operation in the case where those IC cards are inserted, particularly, the processing procedure by the CPU 80 will now be described with reference to FIG. 6.

It is now assumed that the swing supporting plate 62 is held to an attitude (referred to as an idle position) indicated by the alternate long and short dash line in FIG. 4, that is, in the open state of the shutter.

When the IC card A is inserted into the inserting port 12 and the IC card A is detected by the first sensor 51, the card conveying apparatus driven by the motor 40 conveys the IC card A in the forward direction, that is, in the carrying-in direction (steps S11 and S12).

When the conveyed IC card A is detected by the second sensor 52, the conveyance of the card is stopped and the motor 40 is reversely rotated to thereby convey the IC card A in the returning direction by the card conveying apparatus (steps S13, S14 and S15).

In the case where data is read out from or written onto the magnetic stripe of the IC card A by the magnetic head 50, the IC card is conveyed in the forward direction until the IC card A is detected by the third sensor 53 and the reading/writing operation may be performed by the magnetic head 50 in this conveying step. Thereafter, the IC card A is conveyed in the opposite direction until the IC card is detected by the first sensor 51.

When the first sensor 51 again detects the card due to the conveyance of the IC card A in the ejecting (returning) direction, the conveyance of the card is stopped (steps S16 and S17). The swing supporting plate 62 is rotated to the horizontal attitude shown by a solid line in FIG. 4 by the solenoid 69. Thus, the shutter on the card inserting port side is closed and the connector 60 is come into contact with the contact portion C of the IC card A (step S18).

Then, a pin check is executed (step S20). The pin check relates to that the CPU 80 executes the transmission and reception of check data with the IC card through the contact members 61 of the connector 60. If the transmission and reception of the check data are correctly performed, the pin check is OK. Thus, information is transmitted and received between the IC card A and the CPU 80 through the contact between the contact members 61 of the connector 60 and the contacts of the contact portion C of the IC card A. That is, data is read out from and written into the IC card A.

If the pin check has not good, this means that the connector 60 is not correctly come into contact with the contact portion of the IC card. Such a defective contact occurs in the cases where an IC card of another format, e.g., the BULL format was inserted, where an IC card of the U.S.A. or JPN format was inserted in a state such that the upper or back surfaces were set to the attitude opposite of the correct attitude, and the like.

In this case, the connector 60 is returned to the idle position and the motor 40 is reversely rotated, thereby returning the IC card to the card inserting port 12 (step S22).

Since the shutter is commonly used as a supporting plate of the connector, the number of parts can be reduced, the driving mechanism can be simplified, and the IC card reader/writer can be miniaturized.

Figure 7:
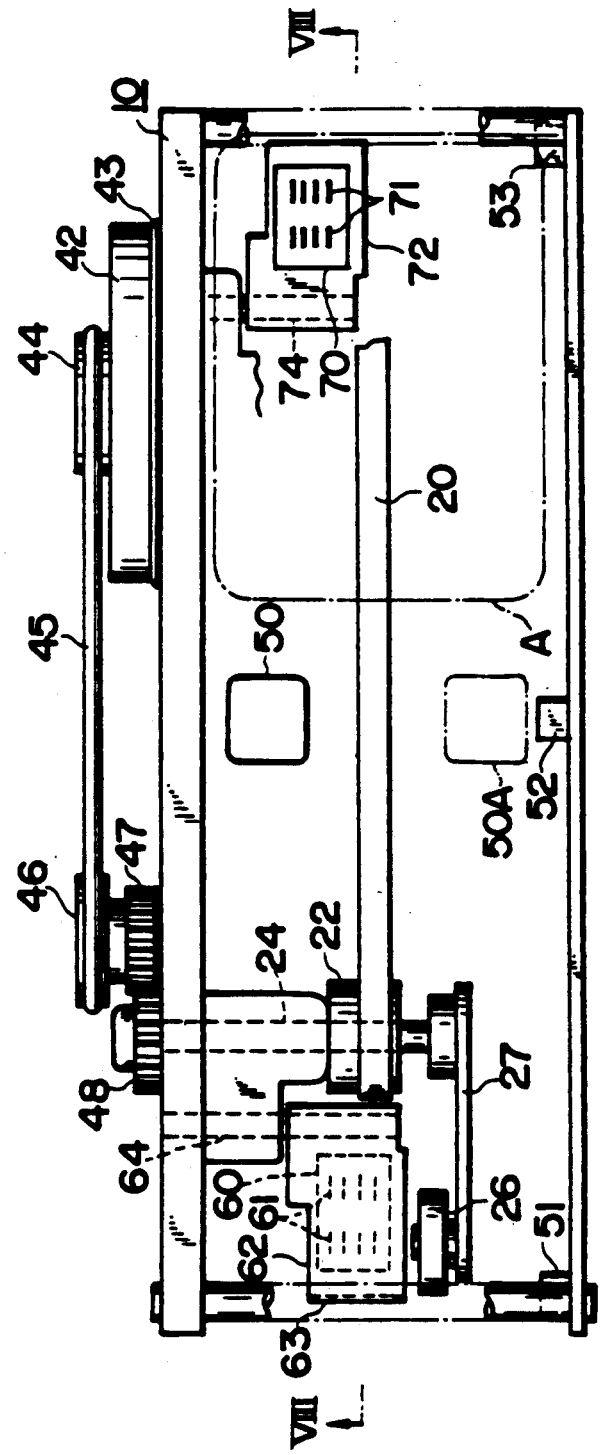
FIG. 7 is a plan view of another embodiment.
Figure 8:
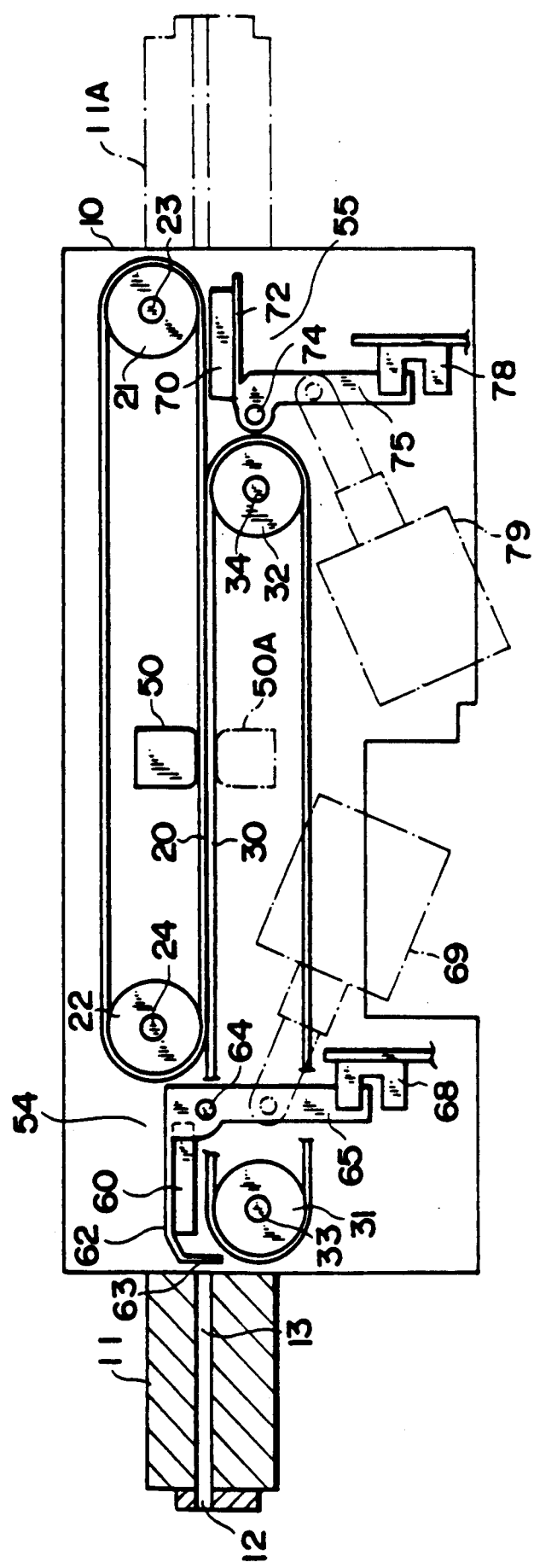
FIG. 8 is a cross sectional view taken along the line VIII—VIII in FIG. 7.

FIGS. 7 and 8 show another embodiment. The IC card reader/writer in this embodiment enables the reading/writing operations of an IC card of the BULL format as well as the U.S.A. and JPN formats. In FIGS. 7 and 8, the same parts and components as those shown in FIGS. 2 to 4 are designated by the same reference numerals.

A swing supporting plate 72 is also provided in the space 55 and a connector 70 having contact members 71 is attached and fixed to the supporting plate 72. The supporting plate 72 and connector 70 are arranged at positions which are slightly deviated to the side so as to correspond to the contact portion $C_2$ of the IC card $A_2$ of the BULL format. The connector 70 faces upwardly. The supporting plate 72 has a lever portion 75 and is pivotally attached to a shaft 74. On the other hand, a sensor 78 to detect the contact position of the connector 70 to the contact portion is provided. The supporting plate 72 is driven by a solenoid 79. The supporting plate 72 is not provided with a portion serving as a shutter.

Although an electrical arrangement is fundamentally similar to that shown in FIG. 5, the sensor 78 is connected to the CPU 80 and a solenoid 79 is controlled by the CPU 80.

Figure 9:
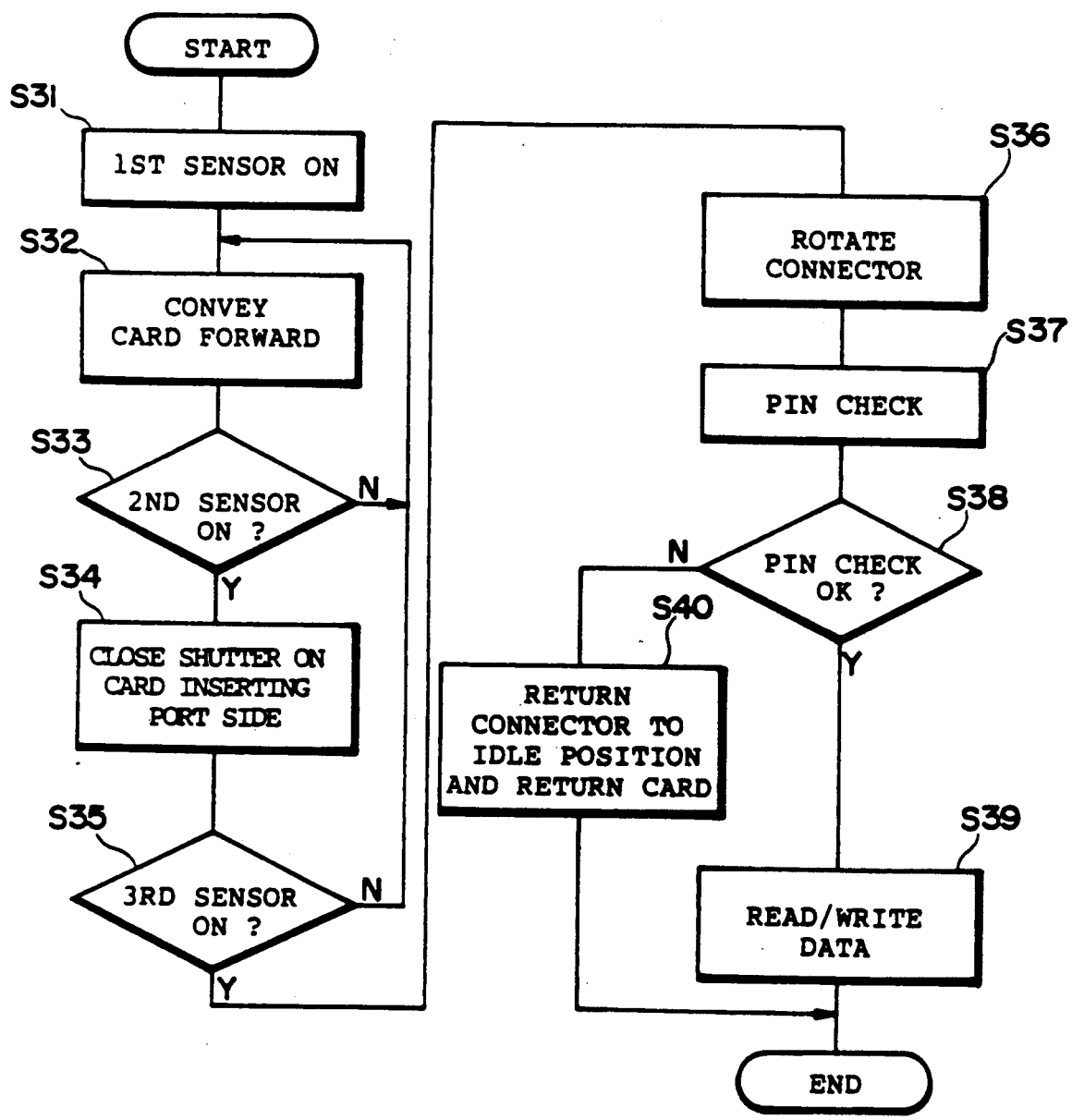
FIG. 9 is a flowchart showing the operation of the IC card reader/writer.

The IC card of the BULL format is inserted into the inserting port 12 in a state in which the back surface faces upward. The operation at this time will now be described with reference to FIG. 9.

When the inserted IC card A is detected by the first sensor 51, the card conveying apparatus conveys the IC card A by the motor 40 in the forward direction, namely, in the inserting direction. In this state, the shutter at the position of the card inserting port 12 is open (that is, the supporting plate 62 is located at the idle position). The supporting plate 72 and connector 70 are also located at the idle position (steps S31 and S32).

When the IC card A conveyed is detected by the second sensor 52, the shutter (i.e., the supporting plate 62) on the card inserting port side is rotated and the conveying path is shut off (the shutter is closed) by the leading portion 63, thereby closing the card inserting port (steps S33 and S34).

If necessary, the reading/writing process of the magnetic stripe is executed by the magnetic head 50 during the conveyance of the IC card.

Further, when the IC card A is detected by the third sensor 53, the conveyance of the card is stopped, the supporting plate 72 rotates, and the connector 70 is come into contact with the contact portion C of the IC card A (steps S35 and S36).

The pin check is then performed. If the result of the pin check is OK, the reading/writing operation of the IC data is executed and the processing routine is finished (steps S38 and S39). If the result of the pin check is NG, the supporting plates 62 and 72 are returned to the idle position, the motor 40 is reversely rotated, the IC card is returned, and the processing routine is finished (step S40).

In steps S34 to S39, the shutter (leading portion 63) closes the card inserting port 12, thereby blocking the IC card in the IC card reader from being moved or pulled out due to the insertion of foreign matter or card from the card inserting port.

In parallel with the connector 70 for the card of the BULL format, another connector can be also further arranged in the space 55 at the position for use of the card of the U.S.A. or JPN format. With this structure, even if the IC card of the U.S.A. or JPN format is inserted in a state in which the upper and back surfaces are reversed, the reading/writing operation can be performed by either the new connector or the connector 60 on the inserting port side.

Further, as shown by an alternate long and short dash line in FIG. 8, an inserting port assembly 11A can be also provided in the edge portion of the frame 10 on the side of the space 55. In this case, a leading portion serving as a shutter is also provided for the supporting plate 72. Moreover, as shown by an alternate long and short dash line 50A, another magnetic head may be also arranged.

Information of an IC card of the three kinds of U.S.A., BULL and JPN formats can be also processed by a single card reader/writer as mentioned above.

If the connector 70 and supporting plate 72 are eliminated, the card reader/writer can be limited to the data process of the IC card of the U.S.A. or JPN format. If the connector 60 and supporting plate 62 are eliminated, the card reader/writer can be limited to the data process of the IC card of the BULL format. If the connectors 70 and 60 are eliminated, the card reader/writer can be used as only a reader/writer of the magnetic card.

On the contrary, if only the magnetic head 50 is eliminated, the card reader/writer can be used as the reader/writer of the IC card having no magnetic stripe.

Therefore, various kinds of card readers/writers can be manufactured by selectively using the magnetic head and connectors while the structure of the main body is commonly used.

What is claimed is:

1. An IC card reader/writer comprising:
    an IC card inserting port:
    an IC card conveying apparatus extending from said IC card inserting port to an inside of the IC card reader/writer;
    a first connector having contact members and disposed near one end of said IC card conveying apparatus, the first connector being adapted to electrically connect with an IC card of first kind of format; and
    a second connector having contact members and disposed near other end of said IC card conveying apparatus, the second connector being adapted to electrically connect with an IC card of second kind of format.

2. An IC card reader/writer as defined in claim 1, further comprising:
    shutter means, provided near the IC card inserting port, for opening or closing the card inserting port; and
    drive means to open or close said shutter means,
    wherein said shutter means comprises a shutter portion to open or close said card inserting port and a supporting portion,
    said supporting portion is provided with said first connector, and
    when said shutter portion is located at a position where said card inserting port is closed, said first connector is located as positions such that said contact members can come into contact with contacts of the IC card.

3. An IC card reader/writer as defined in claim 1, further comprising;
    an another IC card inserting port to which IC card conveying apparatus extends at said other end thereof.

* * * * *